United States Patent
Sadek-Patt

[19]
[11] Patent Number: 6,123,449
[45] Date of Patent: Sep. 26, 2000

[54] MIXING BOWL SPLATTER GUARD

[76] Inventor: Arlene Sadek-Patt, 117 Madison Rd., Northboro, Mass. 01532

[21] Appl. No.: 09/425,581

[22] Filed: Oct. 22, 1999

Related U.S. Application Data

[60] Provisional application No. 60/105,636, Oct. 26, 1998, and provisional application No. 60/130,702, Apr. 24, 1999.

[51] Int. Cl.[7] .................................................. B01F 15/00
[52] U.S. Cl. .......................................... 366/347; 220/731
[58] Field of Search ........................... 366/129, 197–204, 366/344, 347; 220/731, 796, 799; 99/645; D7/387, 391, 376, 379, 380, 412

[56] References Cited

U.S. PATENT DOCUMENTS

| | | | |
|---|---|---|---|
| D. 381,863 | 8/1997 | Vineis | D7/387 |
| 844,906 | 2/1907 | Adams . | |
| 909,052 | 1/1909 | Barron | 366/347 |
| 1,179,984 | 4/1916 | Vidinghoff | 366/347 |
| 2,193,356 | 3/1940 | Green | 366/347 |
| 2,486,320 | 10/1949 | Ost | 366/347 |
| 2,504,727 | 4/1950 | Post | 366/347 |
| 2,517,648 | 8/1950 | Franke | 366/347 |
| 2,681,211 | 6/1954 | Reynolds | 366/347 |
| 2,802,499 | 8/1957 | Tupper | 366/347 |
| 2,858,118 | 10/1958 | Perkins | 366/347 |
| 3,318,583 | 5/1967 | Wright et al. . | |
| 3,913,896 | 10/1975 | Hawke | 366/347 |
| 3,960,370 | 6/1976 | Bewley | 366/347 |
| 4,549,811 | 10/1985 | Schiffner et al. | 366/129 |
| 4,989,748 | 2/1991 | Parr, Jr. et al. . | |
| 5,556,203 | 9/1996 | Filias | 366/129 |
| 5,660,469 | 8/1997 | Segulin | 366/347 |
| 5,893,640 | 4/1999 | Myers et al. | 366/129 |

*Primary Examiner*—Charles E. Cooley
*Attorney, Agent, or Firm*—Blodgett & Blodgett, P.C.

[57] ABSTRACT

A splatter guard for a mixing bowl. The splatter guard is in the shape of a generally circular rigid disc having a central aperture and a slot extending from the central aperture to the peripheral edge surface of the disc. A plurality of spaced friction components project from the bottom surface of the disc for engaging the upper edge surface of the mixing bowl.

18 Claims, 5 Drawing Sheets

MIXING BOWL SPLATTER GUARD

CROSS-REFERENCE TO RELATED APPLICATIONS

This regular patent application is being submitted following the submission by the same inventor of two preliminary patent applications for mixing bowl splatter guards. These preliminary patent applications were "Mixing Bowl Splatter Guard" Ser. No. 60/105,636 filed on Oct. 26, 1998 and "Mixing Bowl Splatter Guard of Hybrid Construction", Ser. No. 60/130,702 filed on Apr. 24, 1999. This patent application will cover the contents of both preliminary patent applications.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

This invention relates generally to a splatter guard that operates with a variety of conventional hand-held electric mixers, conventional mixing bowls, and, more specifically, to a removable, largely transparent splatter guard designed specifically to be used with a broad range of electric mixers and bowls.

The operation of hand-held mixers and most stationary mixers suffer from the following problems. During mixer operation, splatter, or batter ingredients, are flung from the mixer blades onto the user and into the surrounding area, typically a kitchen.

Splashing, or splatter, is largely caused by the rotation of the beater blades while in contact with mixing ingredients, or batter. The rotating beater blades drag, accelerate, and often flings batter from the beater surfaces into the air. This air-borne batter, or splatter, is particularly annoying since it can hit a very large area. The location of this splatter is not well defined and is practically random. The splatter quite often gets on the user's or cook's, hands, clothes and face. Since the location of the splatter within the kitchen is not well defined, the clean-up is difficult and time-consuming.

A recent improvement to stationary mixers is the incorporation of a transparent funnel-shaped shield that mounts onto a special bowl. Both this bowl and funnel-shield are shipped as parts of the complete product. This funnel/shield-bowl combination is available on the "Kitchen Aid-Proline-Heavy Duty Mixer, Model KSM5". The funnel helps protect the user and the environment from splatter. Unfortunately, the funnel is designed for a specific model stationary mixer and a unique bowl with special features. Additionally, the Model KSM5 mixer employs a single-orbital beater which is very unusual for a home mixer.

One other product attempts to solve the splatter problem during start-up. The electric mixer from Krups, the "Krups Power Mix ProMetal 240 W", comes with a mixing bowl with a nominal 8" opening. The electric control of this Krups unit allows for a gradual start of the spinning blades to help reduce "splashing". This feature is referred to as an "antisplash" feature. This "gradual start feature", however, does not address the general problem of splatter during normal operation.

The stationary electric mixer is usually much heavier and typically more expensive than the hand-held mixer. The stationary mixer most often uses two beaters and is coupled to a substantial, stationary base. Hand-held mixers sell for a fraction of the cost of the stationary mixers. The lower cost and smaller size makes these hand-held electric mixers more popular than the stationary electric mixers. The problem of splatter, however, is common to both stationary and hand-held mixers. A product that solves this problem of splatter for the variety of hand-held mixers without the need for any modification to the mixer in a cost-effective, easy-to-use, and sanitary manner would have considerable benefit.

Earlier Concepts Disclosed in Prior Patents

Others have attempted solutions to this problem. None, however, have been commercially successful largely because they lacked the unique features of this proposed invention. Among the patents proposing splatter guard solutions are the following:

| Patentee | U.S. Pat. No. | Issue Date |
| --- | --- | --- |
| Robert L. Adams | 844,906 | Feb. 19, 1907 |
| Charles A. Vidinghoff | 1,179,984 | Apr. 18, 1916 |
| Frank B. Post | 2,504,727 | Apr. 18, 1950 |
| Frieda S. Franke | 2,517,648 | Aug. 8, 1950 |
| Estelle M. Perkins | 2,858,118 | Oct. 28, 1958 |
| James A. Wright | 3,318,583 | May 9, 1967 |
| Ethel M. Hawke | 3,913,896 | Oct. 21, 1975 |
| Adele L. Bewley | 3,960,370 | June 1, 1976 |
| Robert E. Schiffner et al. | 4,549,811 | Oct. 29, 1985 |
| Gregory M. Filias | 5,556,203 | Sept. 17, 1996 |
| Terry L. Myers et al. | 5,893,640 | Apr. 13, 1999 |

While devices listed above do provide a shielding function, they all lack the unique attributes of the proposed invention. Some of the inventions disclosed above do not provide for easy viewing, or easy access to the entire volume of the bowl. Some do not allow for the ease of mixer and bowl manipulation, access for addition of ingredients, or do not provide a resting platform for the case of the hand-held mixer. Some are not appropriate for a wide variety of hand-held mixers.

Specifically, in the case of Filias, the disclosed device does not allow for the use of conventional, unmodified mixers with various lengths of the beater shaft, nor stationary mixers with a longer shaft and curved housing, nor single-beater mixers. The device as proposed by Filias also prevents the user from scraping the bowl and is not suitable for a broad range of beaters. Also, the device as disclosed by Filias does not provide a means for resting the hand-held mixer in any convenient way on the bowl, an important feature or requirement of a splatter guard for hand-held mixers. The device disclosed by Filias also does not allow the cook to rest their hands on the bowl, nor manipulate the bowl, without danger of getting soiled by the mixing ingredients or splatter.

The disclosure of Hawke, makes no reference to transparency, an important requirement for practical use, nor is there a provision for adding material during the mixing process unless the shield, or guard is removed. Also, the solution disclosed by Hawke relies on beater shaft contact to locate the splatter guard in relation to the mixer. This intermittent contact with the high-speed rotating shaft of the mixer encourages wear, friction and noise. Also Hawke lacks any provision for easily adding ingredients or for viewing the mixing process.

Many of the devices described in earlier patents are complicated, expensive and non-hygienic. Some of the patents listed above provide centering of the device to the mixing bowl via contact between the device's outer periphery, or edge, and the edge of the bowl. These patents include those of Vidinghoff and Perkins. Such approaches are not appropriate for a broad range of bowl sizes with a single device. Also, narrowly spaced concentric rings are difficult to clean. Vidinghoff and Perkins also incorporate sliding doors. The sliding doors are difficult to clean because of the intricate features of a sliding door. Also, the sliding doors are expensive to fabricate because they require fine tolerances to provide smooth operation. The sliding door operation also requires significant manipulation.

The prior art which utilized two closely-spaced small holes for beater location are not suitable for the wide range of beater blade base designs nor for various beater blade separation. Such two-hole designs also require that the cook remove the beaters from the mixer for operation and installation. Also, these two-hole designs provide only limited access to the entire volume of the mixing bowl. In some of the prior art, these two-hole designs rely on intermittent contact of the beater shaft to locate the splatter shield of the prior art. Examples of the two-hole design that rely on mixing beater contact for centering or location include Bewley, Franke, Schiffner and Filias.

The splash guard disclosed by Myers is designed to work with special features of a particular hand-held mixer. Improved bowl handling ergonomics is not provided, nor is the guard suitable for the wide variety of hand-held mixers currently on the market or that have been sold.

None of the prior art devices provide "splashing" or "splashing" protection for the vast majority of hand-held mixers in a cost-effective, clean, quiet and easy fashion.
Objectives and Advantages A primary object of the present invention is the provision of a mixing bowl splatter guard designed to work with most hand-held electric mixers and a wide variety of bowls. Some typical electric hand held mixers suitable for use with the present invention include the "Black and Decker "Spatula-Smart" Electric Mixer, Cat. Number M-175" and the "Sunbeam Mixmaster Model 2484".

The disclosed invention is a low-cost component that protects the user and environment from annoying splatter during operation of a food mixer. One goal of the invention is to provide a shield to be interposed between the user and the desired mixing bowl for use with a hand-held or stationary mixer.

An additional goal of this invention is to provide a means to rest a hand-held mixer on the splatter guard while the cook can attend to other matters, such as, obtaining ingredients or checking the recipe. This will save the cook time from constantly placing the mixer on the table and greatly reduce the need for the clean-up of ingredients that drip from the mixing beater, or blades.

Most mixing beaters are formed from a series of four identical half-loops symmetrically mounted to the steel shaft. However, the exact distance between beaters in the case of dual-beater mixers is not controlled by any standard, though it tends to range between 35 mm to 50 mm. Also, the detailed construction of the beater shaft differs among many household mixers. Given this lack of standards, a further object of the present invention is to allow for a range of mixing beater diameters, lengths and shapes and various mixing beater shafts.

Another goal of the invention is to allow for very easy use by not requiring the cook to remove the blades for proper usage. Thus, another goal of the present invention is to provide for easy assembly or location of the splatter guard between the mixer and the intended bowl.

Other goals of the invention include providing a means for easy introduction of additional mixing materials or ingredients with minimal amount of movement or disruption of the mixing set-up.

It is still a further object of the present invention to provide a means to allow the beaters easy access to the entire volume of the bowl.

It is still a further object of the present invention to provide for easy observation of the mixing process through the use of a largely translucent construction.

It is still a further object of the present invention to provide for easy clean-up through the use of simple, crevice-free construction, and allow for electric dishwasher as well as manual cleaning.

It is still a further object of the present invention to allow for easy storage.

It is still a further object of the present invention to allow for use on a wide variety of mixing bowl shapes and sizes, with various bowl thicknesses and construction, without need for any modifications to the existing mixer equipment or bowls.

It is still a further object of the present invention to allow for unimpeded operation of a hand-held mixer by providing for stabilization of the device on the mixer bowl against vibrations induced by the mixer.

It is still a further object of the present invention to allow for single-beater mixers with limited automatic orbital beater motion.

It is still a further object of the present invention to allow for quiet operation.

It is still a further object of the present invention to provide a means to allow cooks to rest their hands on the splatter guard while operating a hand-held mixer while also providing a safety shield from the spinning beaters.

It is still a further object of the present invention to provide a means to allow users of hand-held mixers an improved ergonomic manipulation of the bowl through a combined simultaneous grasping of the bowl and splatter guard.

BRIEF SUMMARY OF THE INVENTION

This invention overcomes the limitations of the earlier inventions by providing complete access to the entire working volume of the bowl while also providing for nearly complete protection from splatter. This invention also allows for single and dual beater mixers as well as mixers with slightly different beater distance. This invention provides a stable mixer resting platform and easy access to all surfaces for cleaning. This invention allows for easy introduction of mixing ingredients both while the mixer is "on" or "off ". Also, this invention requires no modification to the mixer in any way. The invention also does not rely on the mixer shaft for proper orientation or stability thereby mitigating the wear, friction and noise associated with this intermittent contact.

The invention disclosed here incorporates a simple circular profile with a series of at least three regularly spaced features which provide for stabilization and product location on a variety of bowls.

In the case of the splatter guard made from a single material, these features are comprised of regularly raised features which engage the periphery of bowls of various sizes.

In the case of the splatter guard made from hybrid materials, the series of features are made of a specially selected material which differs from the main body of the splatter guard which allow for improved stabilization of the splatter guard on a variety of bowl sizes. These features allow for easier location on mixing bowls of various sizes and bowl edge thicknesses. The hybrid material construction allows for easier use and quieter operation than the splatter guard made of single material. The hybrid, or two material construction is slightly more expensive than the single material construction. However, the easier use and quieter operation affords the hybrid construction superior performance at a slightly higher cost. Both versions address the desired objectives and have relative cost performance tradeoff.

The invention consists of a substantially flat, circular, rigid transparent sheet, 1.5 mm to 7 mm thick, with a narrow slot which runs from the outer edge and leads to a central opening. The device has specially designed orifices, surfaces and slots to allow for easy use on a broad range of mixers. In one embodiment the device also contains a series of landing surfaces made of a different, compliant material which provide a quiet, slip-resistant, or high-friction, mounting interface between the rigid sheet and a variety of bowls. In another embodiment, a set of protuberances made of the same material as the sheet provide stability and centering. The design provides for easy clean-up. The unique features also provides inexpensive fabrication and low cost.

The central opening is nearly circular and can range from 50 mm to 75 mm in diameter. The narrow slot can range from 6 mm to 13 mm in width. The narrow slot and central opening are connected through transition surfaces. The narrow slot is also connected to the outer, largely cylindrical surface of the splatter guard through smooth transition surfaces. These transition surfaces provide for smooth insertion and removal of the splatter guard along the beater shaft resulting in easy assembly and separation.

In one embodiment of the invention, the device is made of two materials, or hybrid construction. The main body of the device is a rigid transparent sheet. The sheet allows the user to rest the mixer on the device surface without requiring the user to place on the table and waste time and allows for material to drip from the blade surface. The rigid sheet is constructed of transparent plastic which allows for nearly complete and easy viewing of the entire mixing process. The main body is constructed of a single plastic piece with no sharp features, thereby providing for easy clean-up, operation and low cost. The rigid sheet also contains a series of compliant, slip-resistant, mounting surfaces of limited extent on at least one side to prevent the device from sliding against a mating top edge surface of a bowl.

In another embodiment, the device is constructed of a single rigid plastic. The rigid sheet also contains a series of protuberances on at least one side to prevent the device from sliding against a mating top edge surface of a bowl.

BRIEF DESCRIPTION OF THE DRAWINGS

The character of the invention, however, may be best understood by reference to one of its structural forms, as illustrated by the accompanied drawings, in which.

DETAILED DESCRIPTION OF THE INVENTION

Reference will now be made to the various FIGS. 1–11.

Figure 1:
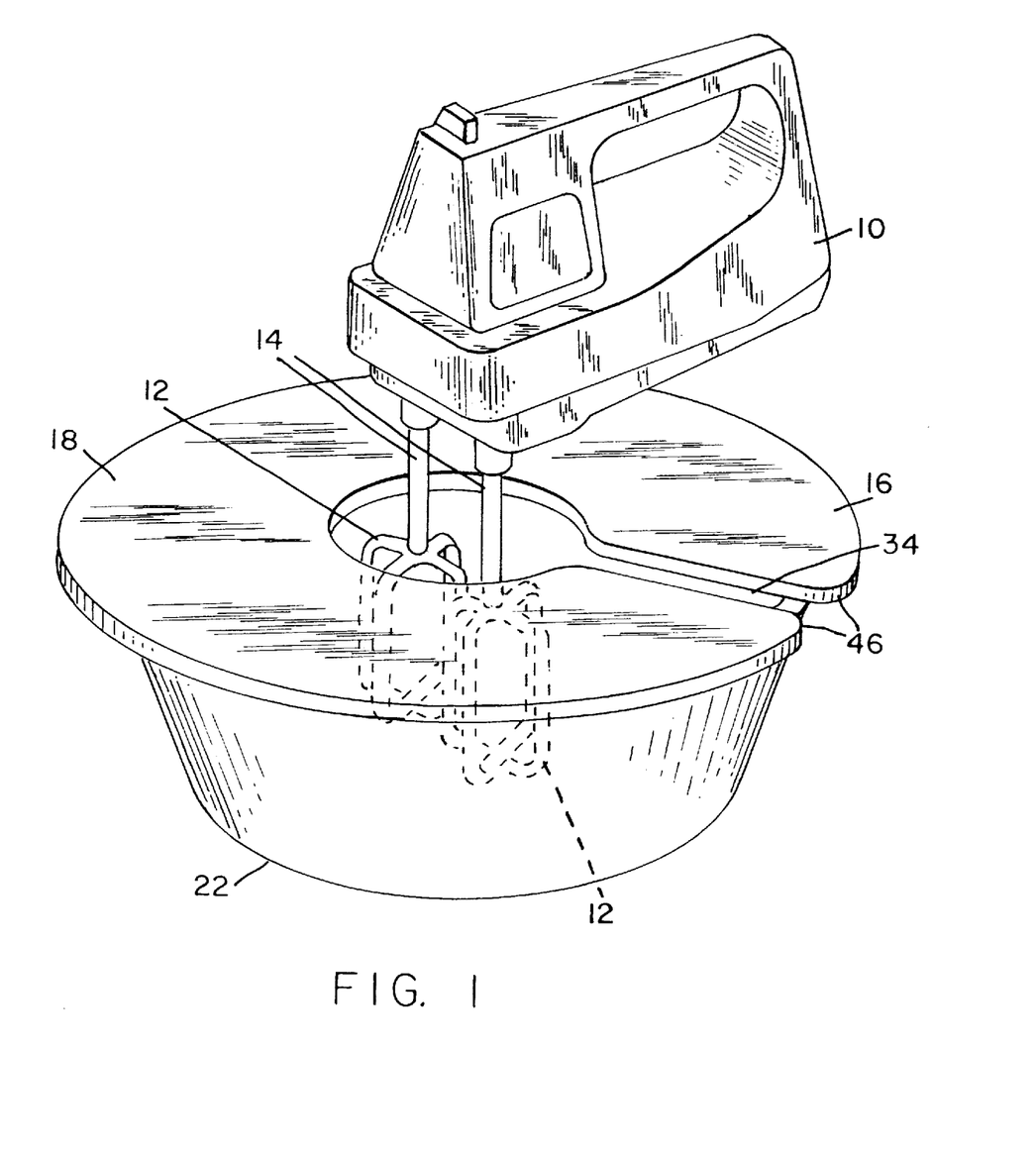
FIG. 1 is a perspective view of a conventional, dual-blade, hand-held electric mixer, mixer bowl, and the splatter guard of hybrid material as it appears when in use.

FIG. 1 shows a typical dual-beater hand-held mixer 10, and a splatter guard 16 in-place between a conventional mixing bowl 22 and mixer 10. Mixer 10 contains two beaters 12 that are driven by and connected to mixer 10 through shafts 14.

Figure 2:
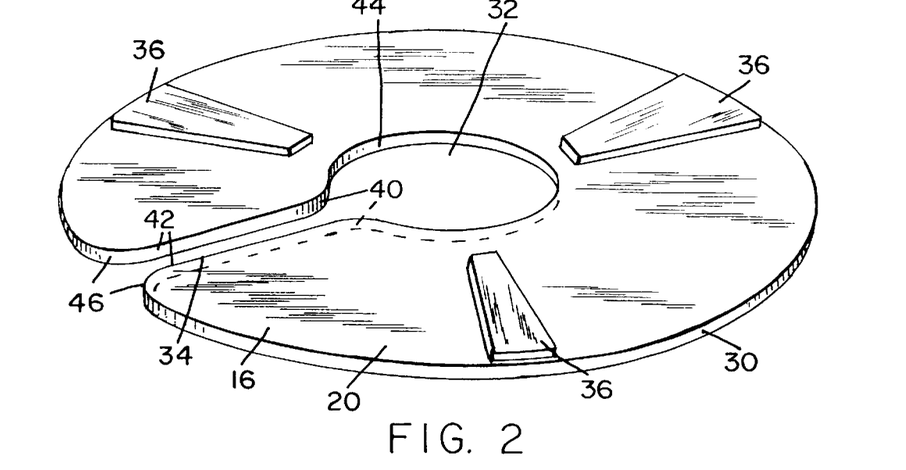
FIG. 2 is a perspective view of the underside of the splatter guard of hybrid material construction of the present invention.

A more detailed perspective view of only splatter guard 16 is shown in FIG. 2. This is a perspective view of the underside of splatter guard 16. This underside faces mixing bowl 22. More of the detailed features that provide this invention with unique benefits are introduced in this figure. Splatter guard 16 has an outer peripheral edge surface 30 which is approximately circular and can be described as a relatively thin, largely circular disk with a series of some special features. Splatter guard 16 is largely disk, or plate shaped arid has two large exposed surfaces, a top surface 18 and a bottom surface 20. The major, or outer diameter of this disk is about 255 mm (10 inches). Experiments and observation of most commonly used mixing bowls indicates that this size will accommodate the vast majority of commonly used mixing bowls. Of course, smaller diameter disks will also work for smaller bowls. However, a single 255 mm (10 in.) diameter splatter guard will cover most bowl sizes between 255 mm (10 in.) and 150 mm (6 in.). Since the diameter of a typical dinner plate is also about 255 mm, locating and cleaning the splatter guard in an electric dishwasher is easy.

In approximately the center of splatter guard 16, there is a circular inner central opening or aperture 32 that extends through the entire thickness of splatter guard 16. The size of the inner central opening 32, determined by some experimentation, should be between 50 mm (2 in.) and 75 mm (3 in.). This allows for easy introduction of additional ingredients. In the case of hand-held mixer 10, mixer 10 can be rested on splatter guard 16 while exposing central opening 32. Ingredients can then easily be added through opening 32. In the case of use with stationary mixer 24, splatter guard 16 can easily be slid from its nominally centered position relative to beater shaft 14 and allow for unobstructed access to central opening 32. Preferably, peripheral edge surface 30 is circular but can be a regular polygon having a sufficient number of sides to form a generally circular peripheral edge surface, i.e., 8 sides or more.

By further reference to FIG. 2, there is a narrow radial slot, 34 running through the thickness of splatter guard 16 which connects inner central opening 32 to outer, peripheral edge surface 30. Narrow slot 34, can be approximately 6 mm (one-quarter inch) to 13 mm (one-half inch) wide and thereby accommodate a variety of beater blade shafts 14. The area of the slot is far less than five percent of the total projected, or shielded area. Thus, slot 34 has negligible adverse effect on the overall shielding effect. Consequently, the vast majority of the shielding function is still maintained while providing for extremely easy placement, removal and cleaning in all stages of use.

The region between narrow slot 34 and inner central opening 32 is connected through two symmetric gradually curved surfaces 40 tangent to both inner surface 44 of central opening 32 and to the edge surfaces 42 of narrow radial slot 42. In addition, transition surfaces 40 are largely parallel to slot surfaces 42 which are substantially perpendicular to both top splatter guard surface 18 and bottom splatter guard surface 20.

Through continued reference to FIG. 2, narrow radial slot 34 is connected to the outer edge surface 30 of splatter guard 16 through another series of symmetric gradually curved surfaces 46. These surfaces are tangent to both the edge surfaces of narrow slot 42 and outer edge surface 30.

Figure 3:
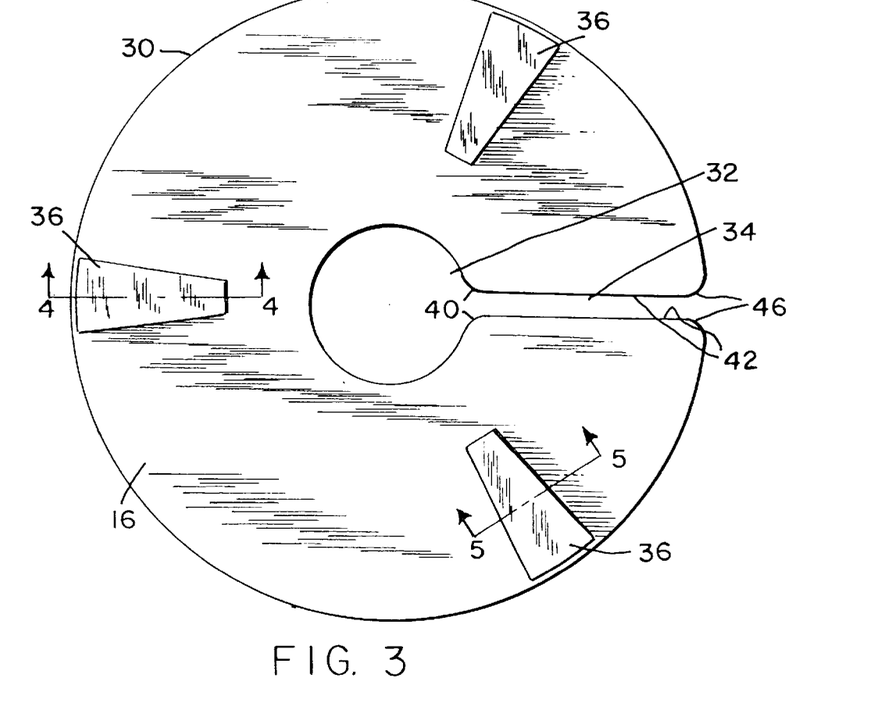
FIG. 3 is a bottom plan thereof.

Reference is now be made to FIG. 3. The bottom plan view of splatter guard 16 shows the general outline of the various openings and features. For example, this view shows that inner transition surface 40 has a radius of 5 mm to 20 mm. Splatter guard 16 also includes several friction components or stabilization pads 36. Stabilization pads 36 provide lateral stability of splatter guard 16 on mixing bowl 22 against the vibrations induced by hand-held mixer 10. Pads 36 are made of a compliant or resiliently yieldable material such as rubber which is significantly softer than the main body of splatter guard 16. Pads 36 can be added to the main body with adhesives, through direct thermoplastic bonding, or, can be co-molded or post-molded with an injection molding process.

Splatter guard 16 rests on mixing bowl 22 through pads 36. Pads 36 occupy a small portion of the surface so that pads 36 do not substantially interfere with viewing the mixing process through splatter guard 16. Pads 36 may be transparent though it is not essential.

Pads 36 are fabricated from a compliant or resiliently yieldable material such as natural or synthetic rubber. The Shore hardness scale A is commonly used to designate the hardness of compliant or rubbery material. Mounting pads 36 have a Shore hardness A ranging from 20–70. If pads 36 are made from a transparent material, such as silicone, pads 36 actually forms a series of optical distorting surfaces, or unintentional lenses. Since pads 36 do not cover a large part of the surface of splatter guard 16, pads 36 do not impede the casual viewing of the mixing process. In all cases, whether pads 36 are made of a transparent, translucent, or opaque material, they occupy a small fraction of the entire surface and do not significantly impede with the viewing of the mixing process.

The minimum number of mounting pads 36 is three, since three points will define a plane. An excessive number of pads 36 would make manual cleaning more difficult. The preferred embodiment of the invention employs a series of three pads 36 on splatter guard surface 20. Pads 36 shown in FIG. 3. are equidistant from each other, or roughly 120 degrees apart. FIG. 3 also shows that one pad 36 is placed opposite the narrow slot 34. This is done to produce a part with as much symmetry as possible.

Pads 36 accommodate a variety of mixer bowls. Each pad 36 lies on a generally radial line that extends from the center of splatter guard 16 to outer surface 30. Pad 36 can extend from the inner central opening 32 to the outer circular surface 30. The minimum length of pad 36 is about one half of the available distance, or about 65 mm. The width of pad 36 in the azimuthal or circumferential direction can vary from 5 mm to 35 mm.

Figure 4:
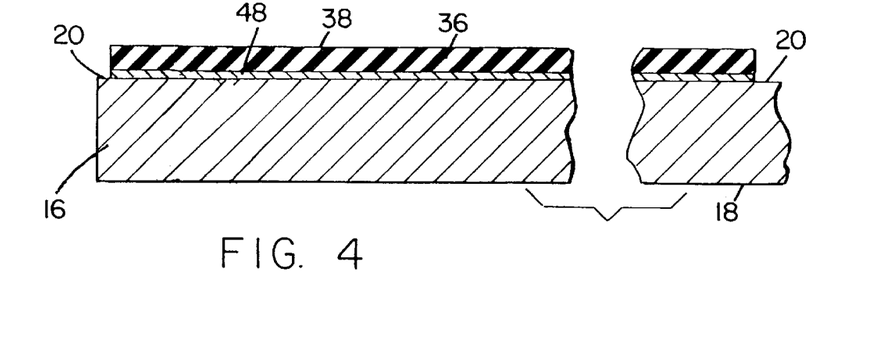
FIG. 4. is a fragmentary vertical cross-sectional view, taken along line 4—4 of FIG. 3 and looking in the direction of the arrows.
Figure 5:
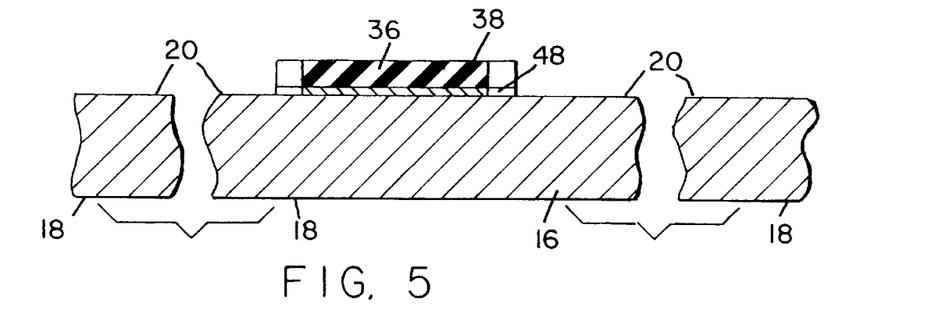
FIG. 5. is a fragmentary vertical cross-sectional view, taken along line 5—5 of FIG. 4 and looking in the direction of the arrows.
Figure 6:
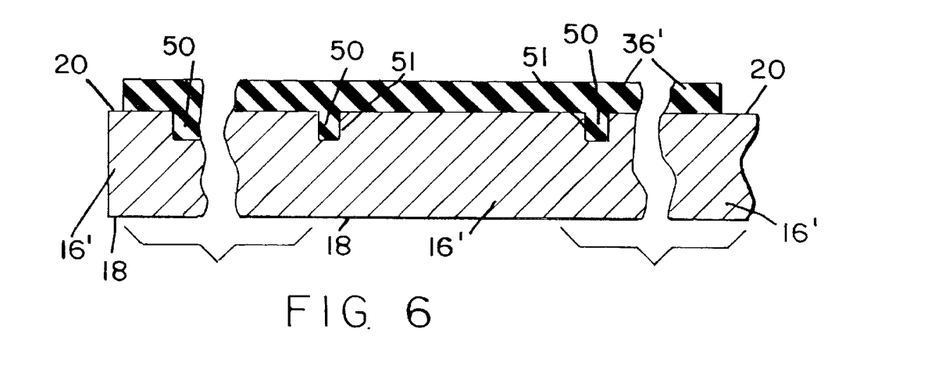
FIG. 6 is a vertical cross-sectional view similar to FIG. 4 of an alternate embodiment.

A more detailed view of pads 36 are provided in FIGS. 4, 5, and 6. Pads 36 are made from a compliant or resiliently yieldable material which can conform to various bowl sizes, bowl material thickness and bowl lip detail. Splatter guard body 16 lies on the outer lip of conventional mixing bowl 22 by resting on pad 36.

Referring to FIG. 4, the overall height or thickness of the pad can range from 1 mm to 8 mm when in the unloaded or undeformed state. Pads 36 all have the same nominal thickness. Exposed surface 38 of pad 36 may contain additional surface undulations or roughening features. Pad 36 is either adhered to splatter guard surface 20 through the use of intermediate adhesive 48, or, through direct thermoplastic boding.

Since pads 36 are much softer than either bowl 22 or guard body 16, pads 36 will clearly deform and adapt to the shape of the edge of bowl 22 when splatter guard 16 is in place. The pad 36 can be made of any rubber-like elastomer to provide a "soft" or "no slip" surface. The degree of material distortion around the bowl edge is a function of the specific thickness and Shore hardness of the mounting pad. For example, a pad 36 made from a material with Shore hardness A 60 and 2 mm thick would have minimal distortion or compression around the mixing bowl. Even though conformal distortion around the edge of the bowl is minimal, these materials provides adequate "traction" with the mixing bowl lip with the additional benefit of a soft and glossy surface to damp out vibrations induced from the mixer. A material having a Shore hardness A of 50–70, would not attract any debris or particles. A pad having a Shore hardness A of 60 is ideal.

FIG. 5. shows a vertical cross-sectional view of stabilization pad 36 in a direction transverse to that shown in FIG. 4. The thickness of pad 36 is nominally uniform in this direction except for some optional tapering from the top surface of pad 36 to surface 20 of splatter guard 16. As shown in FIG. 5, pads 36 can be directly bonded to splatter guard 16 without the need for optional adhesive 48.

FIG. 6 is a view similar to FIG. 4 showing how modified mounting pad 36' can be mechanically locked to the rigid plastic portion of modified splatter guard 16'. Pads 36' have a plurality of anchoring tabs 50 extending into depression 51 in the disc portion of modified guard 16'. This construction allows for permanent joining of the pads 36' with the rigid transparent plastic of splatter guard 16'. The compliant material of pads 36' is added to the main body of splatter guard 16' during injection molding and provides a permanent mechanical means of fastening the pads 36' to the disc 16' together.

An alternate embodiment of this invention (not shown) includes a design in which pads 36 or 36' are produced on both bottom surface 20 and top surface 18. This embodiment results in a structure with minimal difference between the two major surfaces. In the case of mechanical interlocking as described above, the interlocking features can extend through the entire thickness of the main body portion of the splatter guard. In such a case, there is no significant distinction between the two surfaces and the designation "top" or "bottom" no longer has any meaning. This would make operation completely obvious and no distinction between the "bottom" or "top" would be needed.

In yet another embodiment of this invention (not shown), inner central opening 32 and radial slot 34 can have raised edges or "lips" to aid in blade motion or to help contain splattered food. The height of these "lips" should not exceed the height, or thickness, of the mounting pads 36 or 36'.

Figure 7:
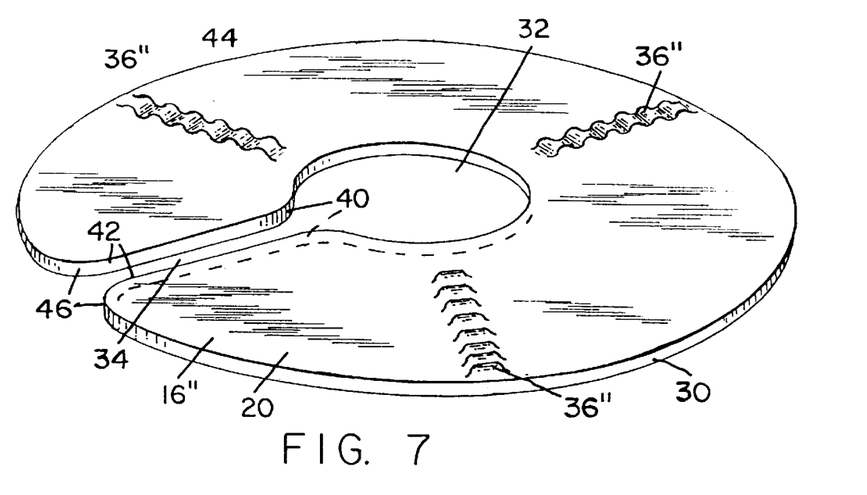
FIG. 7 is a perspective view of an alternate embodiment of the present invention whereby the splatter guard is made of a single rigid material.

Reference is now made to FIG. 7. in this alternative embodiment, a splatter guard 16" is made of one single, rigid material. In essence, the compliant softer material of stabilization pads 36 or 36' have been replaced with different friction components in the form of a series of protuberances 36" at similar location and extent on splatter guard 16". Much of the design features in FIG. 7. have been disclosed and described above. All remaining portions of splatter guard 16" are the same as those of splatter guard 16.

In the rigid, single plastic embodiment, splatter guard 16" includes a series of protuberances 36" as part of its structure. Protuberances 36" provide lateral slability of splatter guard 16" on mixing bowl 22 against the vibrations induced by hand-held mixer 10. Protuberances 36' also help the user in centering splatter guard 16 on mixing bowl 22. Protuberances 36" can ideally be molded or fabricated as part of the splatter guard 16". Alternatively, protuberances 36" can also be made separately and added to the surface of the main body portion of splatter guard 16".

Figure 8:
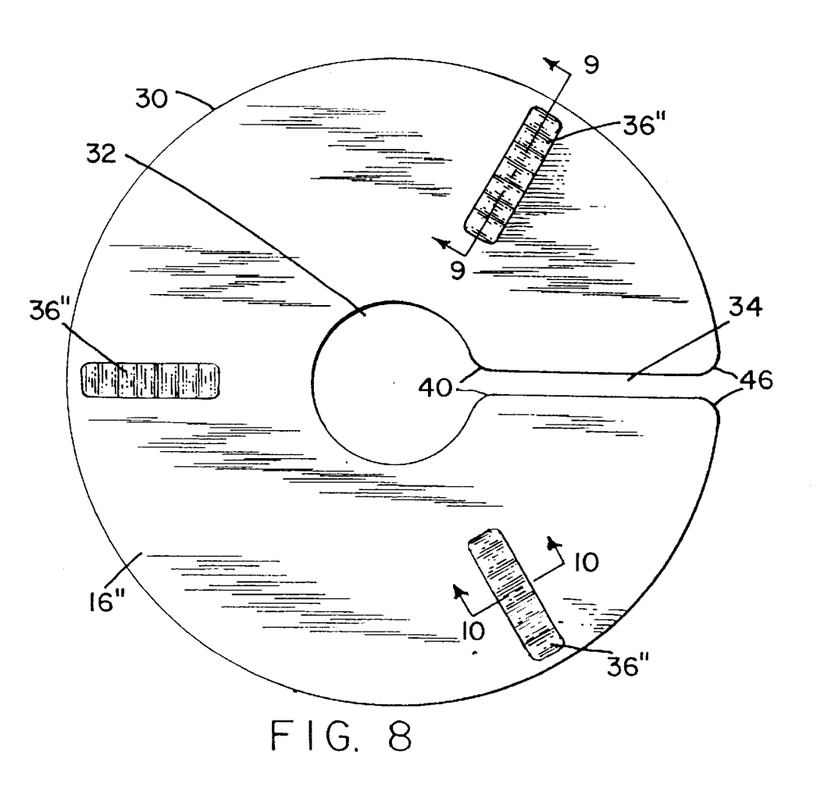
FIG. 8 is a bottom plan thereof.

Reference is now made to FIG. 8. splatter guard 16" rests on mixing bowl 22 through protuberances 36". Ideally, protuberances 36" are also transparent and occupy a small portion of the surface so that protuberances 36" do not substantially interfere with viewing the mixing process through splatter guard 16". Protuberances 36" can also be fabricated from a separate transparent material and actually form a series of optical distorting surfaces, or unintentional lenses. Since protuberances 36" do not cover a large part of the surface of splatter guard 16", these lenses do not impede the casual viewing of the mixing process. The minimum number of protuberance segments, or protuberance series 36" is three since three points will define a plane. An excessive number of protuberances 36" would make manual cleaning more difficult. The preferred embodiment employs a series of three protuberance segments 36" on splatter guard surface 20. Protuberances 36" shown in FIG. 8 are equidistant from each other, or roughly 120 degrees apart. FIG. 8 also shows that one protuberance segment 36" is placed opposite the narrow slot 34. This is done to produce a part with as much symmetry as possible.

Protuberances 36" are designed to accommodate typical mixer bowl construction. Each series of protuberances 36" lie on an imaginary generally radial line that extends from the center of splatter guard 16" to outer surface 30. Protuberances 36" can extend from the inner central opening 32 to the outer circular surface 30. The minimum radial extent of protuberances 36" is about two-thirds of the available distance, or about 65 mm. Each line is protuberances 36" is shown as straight in FIG. 7 but could also be curved along a generally radial path.

Figure 9:
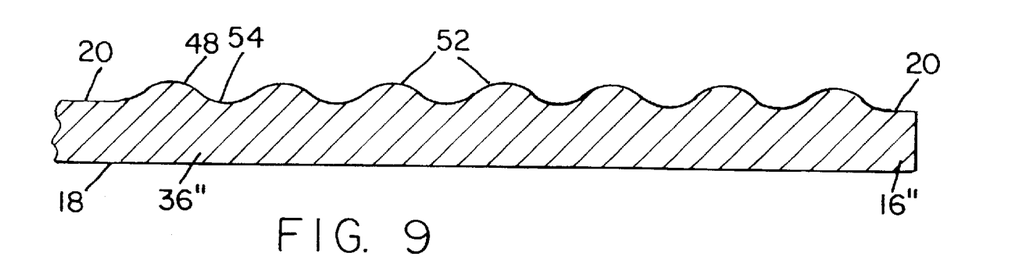
FIG. 9 is a fragmentary vertical cross-sectional view, taken along line 9—9 of FIG. 8 and looking in the direction of the arrows.
Figure 10:
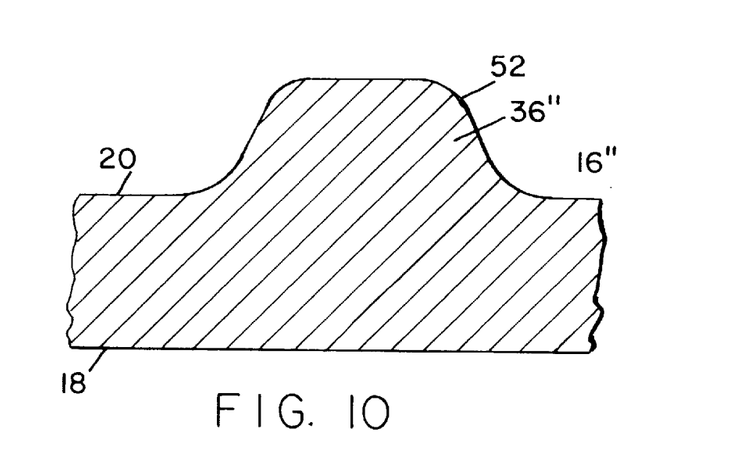
FIG. 10 is a fragmentary vertical cross-sectional view, taken along line 10—10, of FIG. 8.
Figure 11:
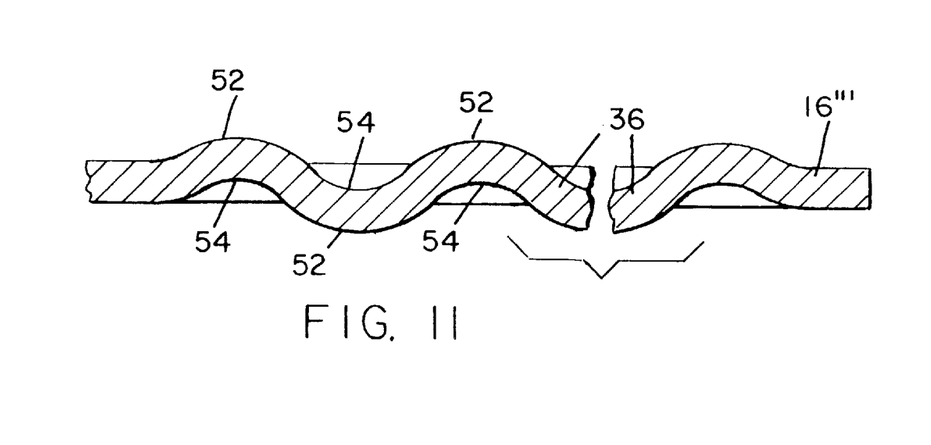
FIG. 11 is a vertical cross-sectional view similar to FIG. 9 of an alternate embodiment.

A more detailed view of protuberances 36" are provided in FIGS. 9, 10, and 11. Protuberances 36" are composed of a series of regular convex surface segments 52 alternating with concave surface segments 54 which mate and can rest on the outer lip of conventional mixing bowl 22. Surface segments 52 and 54 have a radius of 2 mm to 10 mm and are generously filleted to blend with bottom surface 20 of the splatter guard 16" and with each other.

FIG. 9 shows a detailed sectional view of the protuberances in a plane parallel to the length of the protuberance 36" and perpendicular to the bottom surface 20 of guard 16". This figure indicates that the overall height of each protuberance 36" can be about 3 mm to 10 mm. Protuberances 36" can have rounded or flat peaks. The peak height and pattern of each surface segment 52 should be the same for all protuberances 36" that are equidistant from the center of splatter guard 16. Thus surface segments 52 can vary along the radial direction, but ideally should be the same in the circumferential direction. In other words, the surface segments 52 are nominally repeated at three locations approximately 120 degrees apart.

FIG. 10 depicts a detailed sectional view of the protuberances along a plane perpendicular to the length of protuberance 36" and perpendicular to the plane of surface 18 of splatter guard 16". The width of each protuberance 36" in this view is about 5 mm to 15 mm. This figure shows that each protuberances 36" is generously filleted to the splatter guard surface 20 for safety and ease of cleaning. The extent of the flat section shown at the top of each convex surface 52 can vary from zero to roughly two-thirds of the width of the protuberance 36".

FIG. 11 depicts a still further modified splatter guard 16'" having protuberances 36'". In this embodiment, protuberances 36'" are produced on both, the bottom, surface 20 and the top surface 18 of guard 16'". The material thickness is roughly constant through this cross-section. This pattern can be easily formed via thermoforming or injection molding.

The general shape in the transverse direction above or below the guard surfaces is analogous to that already shown in FIG. 10. The protuberances 36'" have convex surface segments 52 and concave surface segments 54 on both sides of the guard 16'".

Operation

The operation of all embodiments of the splatter guard of the present invention should now be evident from its construction and design. In the case where pads or protuberances are provided only on bottom surface 20, the user orients the splatter guard such that the pads or protuberances of bottom surface 20 face mixing bowl 22. In the case of operation with hand-held mixer 10, the cook, slides beater shaft 14 as it is normally installed in mixer 10, along the outer transition surface 46, through radial slot 34, along inner transition surface 40 and finally into inner central opening 32. The combination of hand-held mixer 10 and splatter guard is then placed on conventional mixing bowl 22. The splatter guard rests on the 10 mixing bowl 22 through the mounting pads or protuberances.

In the case of any of the single, rigid material embodiment, the splatter guards 16', 16", or 16'" can be fabricated via injection molding or stamping coupled to thermoforming. These manufacturing methods allow for low manufacturing cost and inclusion of the described key features. None of the splatter guard embodiments of the present invention have any unusual or accurate mating features, thereby making manufacture simple, reliable, and cost effective. Because each splatter guard 16 of the present invention rests on bowl 22 through a group of three protuberances of limited extent, the requirement for overall flatness is minimal, thereby further easing the manufacturing requirements of the splatter guard.

In the case of the hybrid material embodiment, splatter guards 16 and 16' can be fabricated via injection molding or stamping coupled to thermoforming, and post-assembly of the mounting pads to the splatter guard body. Alternatively, the splatter guard main body and pads can both be formed via injection molding. These manufacturing methods allow for low manufacturing cost and inclusion of the described key features. Splatter guards 16 and 16' do not have any unusual or accurate mating features, thereby making manufacture simple, reliable, and cost effective.

In the hybrid material design, shown in FIGS. 1–6, splatter guards 16 and 16' are constructed from two materials. Both the hybrid material design and single, rigid plastic design have similar requirements for the material composing the main body. The large disk-shaped stiff section is fabricated from a single piece of transparent plastic. Additional requirements of the rigid plastic are; a) high elongation-to-break to allow for flexing and cleaning, b) high heat resistance to ideally allow for "top and bottom" dishwasher placement, c) resistance to crazing and cracking from washing and washing detergents, d) low cost to allow for broad consumer acceptance, e) good mold flow characteristics, f) high clarity to allow for easy viewing of the mixing process, g) scratch resistance, h) impact resistance, i) regulatory approval for food contact, and j) chip resistance. Though one plastic does not excel in all these categories, plastics which meet many of these requirements include Polycarbonate (PC), Acrylic and Styrene-acrylonitrile (SAN). Certain grades of Polypropylenes (PP) and Polystyrenes (PS) would offer lower cost and lower performance versions of the splatter guard.

Specific grades for each type of plastic have been developed and continue to be developed with improved properties in many of these areas. Polycarbonate plastics approved for food contact by the FDA, such as Lexan from General Electric or Makrolon from Bayer are suitable materials. Polycarbonates modified with scratch-resistant coatings are expected to have even superior scratch resistance, however, this adds cost. Lower cost material such as SAN, or LUSTRAN 31 from Bayer is suitable where limited exposure to the heat of the bottom tray of dishwasher is expected. Also, special grades of copolyester from Eastman Chemical with tradename "Eastar" also posses many of the required attributes as well as co-molding capability with several thermoplastic elastomers. However, because of continued development in plastic materials, the relative "ranking" of each type is expected to change. Persons experienced in the field will be able to select a particular plastic based on the guidelines provided, desired product lifetime, plastics modifications, and costs of the various plastics identified here. The plastics are provided for example purposes only and other plastics that meet the general requirements identified above would also be suitable.

In the hybrid material embodiment, the mounting pads are made from compliant plastic of either thermoset or thermoplastic type. "Shore A" hardness can range from 20 to 70. If the pads are made of foam, an FDA approved, closed-cell formulation should be used to allow for hygienic operation. In the case of thermoplastic, an FDA grade thermoplastic elastomer (TPE) such as Sarlink from DSM, Kraton from Shell, and Santoprene from Advanced Elastomer Systems, can be used to fabricate the mounting pad, either as a separate piece, or ideally, as a molded component when the disk is fabricated. This molding can be done as part of the same mold, or as a secondary molding process. The mounting pad can be fabricated from silicone or some other FDA approved compliant, closed-cell foam or elastomer. The specific plastic used can vary, and those skilled in the art can vary the thickness and shore hardness of a variety of compliant elastomers within the range specified to achieve the desired result.

What is claimed is:

1. A splatter guard for a mixing bowl having an upper edge surface, said splatter guard comprising:
 (a) a generally circular rigid planar disk having a horizontal bottom surface, a top surface, a peripheral edge surface, a central aperture, and a slot extending from said central aperture to said peripheral edge surface; and
 (b) a plurality of spaced friction components projecting downwardly from said horizontal bottom surface, each of said friction components being located along a horizontal generally radial line from said central aperture to said peripheral edge surface and fixed relative to said disk, each of said friction components having a greater coefficient of friction than said bottom surface for providing frictional engagement with the upper edge surface of said mixing bowl to maintain said disk on said mixing bowl.

2. A splatter guard as recited in claim 1, wherein each of said friction components is a plurality of protuberances which are integral with said disk and are continuous with said bottom surface.

3. A splatter guard as recited in claim 2, wherein each of said friction components is a continuous curved surface of alternating concave and convex surface segments.

4. A splatter guard as recited in claim 3, wherein each of said friction components is a strip having a wave form that has upwardly facing alternating convex and concave surface segments downwardly and facing alternating convex and concave surface segments.

5. A splatter guard as recited in claim 4, wherein each of said strips has the same thickness as the remaining portions of said disk, said upwardly facing convex surface segments are vertically aligned with said downwardly facing concave surface segments, and said upwardly facing concave surface segments are vertically aligned with said convex downwardly facing surface segments.

6. A splatter guard as recited in claim 5, wherein each of said concave portions is located between said top surface and said bottom surface and said convex portions are located outside of said top surface and said bottom surface.

7. A splatter guard as recited in claim 1, wherein said disk is transparent.

8. A splatter guard as recited in claim 1, wherein said central aperture is substantially from 50 mm to 75 mm in diameter.

9. A splatter guard as recited in claim 1, wherein the thickness of said disk is substantially from 1.5 mm to 7 mm.

10. A splatter guard as recited in claim 1, wherein the width of said slot is substantially from 6 mm to 13 mm.

11. A splatter guard as recited in claim 1, wherein there are at least three friction components spaced 120 degrees apart.

12. A splatter guard for a mixing bowl having an upper edge surface, said splatter guard comprising:
 (a) a generally circular rigid disk having a bottom surface, a top surface, a peripheral edge surface, a central aperture, and a slot extending from said central aperture to said peripheral edge surface; and
 (b) a plurality of spaced protuberances which are integral with said disk and are continuous with said bottom surface, each of said protuberances being located along a generally radial line from said central aperture to said peripheral edge surface and fixed relative to said disk, each of said protuberances is a continuous curved surface of alternating concave and convex surface segments having a greater coefficient of friction than said bottom surface for providing frictional engagement with the upper edge surface of said mixing bowl to maintain said disk on said mixing bowl, the lowest point of each convex surface segment being substantially below said bottom surface and the highest point of each of said concave surface segments is in the same plane as said bottom surface.

13. A splatter guard for a mixing bowl having an upper edge surface, said splatter guard comprising:
   (a) a generally circular rigid flat disk having a bottom surface, a top surface, a peripheral edge surface, a central aperture, and a slot extending from said central aperture to said peripheral edge surface; and
   (b) a plurality of spaced friction components fixed relative to said disk and projecting from said bottom surface, each of said friction components being located along a downwardly generally radial line from said central aperture to said peripheral edge surface horizontally and extending from said peripheral edge surface for one-half of the distance between said peripheral edge surface and said central aperture, each of said friction components having a greater coefficient of friction than said bottom surface for providing frictional engagement with the upper edge surface of said mixing bowl to maintain said disk on said mixing bowl.

14. A splatter guard for a mixing bowl having an upper edge surface, said splatter guard comprising:
   (a) a generally circular rigid disk having a bottom surface, a top surface, a peripheral edge surface, a central aperture, and a slot extending from said central aperture to said peripheral edge surface; and
   (b) at least three friction components spaced 120° apart and projecting from said bottom surface, each of said friction components being located along a generally radial line from said central aperture to said peripheral edge surface and fixed relative to said disk, each of said friction components having a greater coefficient friction than said bottom surface for providing frictional engagement with the upper edge surface of said mixing bowl to maintain said disk on said mixing bowl, one of said friction components being on the opposite side of said aperture and diametrically opposed to said slot.

15. A splatter guard for a mixing bowl having an upper edge surface, said splatter guard comprising:
   (a) a generally circular rigid disk having a bottom surface, a top surface, a peripheral edge surface, a central aperture, and a slot extending from said central aperture to said peripheral edge surface; and
   (b) a plurality of spaced friction components projecting from said bottom surface, each of said friction components being located along a generally radial line from said central aperture to said peripheral edge surface and fixed relative to said disk, each of said friction components having a greater coefficient of friction than said bottom surface for providing frictional engagement with the upper edge surface of said mixing bowl to maintain said disk on s aid mixing bowl, each of said friction components being made of a pad of material which differs from the material of said disk and being fixed to said disk.

16. A splatter guard as recited in claim 15, wherein said disk is made of a transparent thermoplastic material and each of said pads is made of an elastomeric material.

17. A splatter guard as recited in claim 15, wherein said disk is mad of a rigid thermoplastic material and each of said pads is made of a resiliently yieldable material which is substantially softer than said disk.

18. A splatter guard as recited in claim 17, wherein each of said pads has a Shore A hardness from 20 to 70.

* * * * *